United States Patent
Lahr

(10) Patent No.: US 10,146,865 B2
(45) Date of Patent: Dec. 4, 2018

(54) TAGONOMY—A SYSTEM AND METHOD OF SEMANTIC WEB TAGGING

(71) Applicant: Orions Digital Systems, Inc., Snoqualmie, WA (US)

(72) Inventor: Nils B. Lahr, Snoqualmie, WA (US)

(73) Assignee: Orions Digital Systems, Inc., Snoqualmie, WA (US)

(*) Notice: Subject to any disclaimer, the term of this patent is extended or adjusted under 35 U.S.C. 154(b) by 423 days.

(21) Appl. No.: 14/506,412

(22) Filed: Oct. 3, 2014

(65) Prior Publication Data

US 2015/0100873 A1 Apr. 9, 2015

Related U.S. Application Data

(60) Provisional application No. 61/887,280, filed on Oct. 4, 2013.

(51) Int. Cl.
*G06F 17/00* (2006.01)
*G06F 17/30* (2006.01)
*G06F 17/27* (2006.01)

(52) U.S. Cl.
CPC .... *G06F 17/30731* (2013.01); *G06F 17/2785* (2013.01)

(58) Field of Classification Search
CPC ............. G06F 17/241; G06F 17/30731; G06F 17/30734; G06F 17/2875
See application file for complete search history.

(56) References Cited

U.S. PATENT DOCUMENTS

| | | | | |
|---|---|---|---|---|
| 6,847,974 B2* | 1/2005 | Wachtel | ............ | G06F 17/30893 707/822 |
| 6,947,923 B2* | 9/2005 | Cha | .................... | G06F 17/30684 |
| 7,284,196 B2* | 10/2007 | Skeen | ..................... | G06F 17/22 707/999.001 |
| 7,328,209 B2* | 2/2008 | Das | ................... | G06F 17/30418 |
| 7,478,105 B2* | 1/2009 | Albornoz | ............ | G06F 17/3089 |
| 7,533,122 B2* | 5/2009 | Drumm | ............. | G06F 17/30914 |
| 7,593,967 B2* | 9/2009 | Harnsberger | ........... | G06F 17/24 |
| 7,636,702 B2* | 12/2009 | Perl | ..................... | G06F 17/3089 706/45 |
| 7,673,282 B2* | 3/2010 | Amaru | ............. | G06F 17/30557 717/104 |
| 7,707,147 B2* | 4/2010 | Steels | ............... | G06F 17/30864 707/713 |

(Continued)

*Primary Examiner* — Laurie A Ries
(74) *Attorney, Agent, or Firm* — Lee & Hayes, PC

(57) ABSTRACT

A directed graph and a semantic ontology are simultaneously employed to enable tagging of data. Tags from the directed graph contain special properties linking them to a semantic ontology such that activating a node on the graph, will provide specific actions relating to one or more ontologies. Humans or machine executable algorithms can use the directed graph as a classification system, which enables a decision making process to occur, one step at a time. Such an approach enables complex problems sets to be broken down into smaller directed graph processes. Each process can then be either automated using computer executed algorithms, manual using humans, or a combination of both. In this way an n-tiered workflow system can be developed that enables large scale asynchronous and distributed tagging.

20 Claims, 9 Drawing Sheets

(56) References Cited

U.S. PATENT DOCUMENTS

| | | | | |
|---|---|---|---|---|
| 7,720,778 B2* | 5/2010 | Friesen | G06Q 30/02 706/45 |
| 7,730,098 B2* | 6/2010 | Lim | G06F 17/30404 707/793 |
| 7,761,480 B2* | 7/2010 | Toledano | G06F 17/30463 707/804 |
| 7,853,618 B2* | 12/2010 | Yuan | G06F 17/30684 706/55 |
| 7,877,726 B2* | 1/2011 | Sabbouh | G06F 17/30893 706/11 |
| 7,899,804 B2* | 3/2011 | Naaman | G06F 17/30731 707/708 |
| 7,899,861 B2* | 3/2011 | Feblowitz | G06F 8/34 709/201 |
| 7,930,288 B2* | 4/2011 | Delgado | G06F 17/278 707/706 |
| 8,433,715 B1* | 4/2013 | Mirhaji | G06F 17/30312 707/756 |
| 8,874,552 B2* | 10/2014 | Jehuda | G06F 17/30734 707/722 |
| 8,983,995 B2* | 3/2015 | Hsu | G06F 17/3064 705/26.62 |
| 8,996,555 B2* | 3/2015 | Kuchmann-Beauger | G06F 17/30389 707/763 |
| 9,720,895 B1* | 8/2017 | Warren | G06F 17/241 |
| 2003/0191627 A1* | 10/2003 | Au | G06F 17/2785 704/9 |
| 2005/0125717 A1* | 6/2005 | Segal | G06F 17/242 715/201 |
| 2006/0074980 A1* | 4/2006 | Sarkar | G06F 17/3089 |
| 2006/0136194 A1* | 6/2006 | Armstrong | G06F 17/30731 704/4 |
| 2007/0033221 A1* | 2/2007 | Copperman | G06F 17/30616 |
| 2007/0239430 A1* | 10/2007 | Ollason | G10L 15/1822 704/9 |
| 2008/0104032 A1* | 5/2008 | Sarkar | G06F 17/3089 |
| 2010/0231721 A1* | 9/2010 | Meloche | G08G 5/065 348/159 |
| 2011/0196670 A1* | 8/2011 | Dang | G06F 17/2785 704/9 |
| 2011/0320114 A1* | 12/2011 | Buxton | G01C 21/362 701/439 |
| 2013/0091113 A1* | 4/2013 | Gras | G06F 17/30864 707/706 |
| 2013/0275448 A1* | 10/2013 | Mirhaji | G06F 17/30312 707/756 |
| 2015/0019202 A1* | 1/2015 | Tremblay | G06F 17/2785 704/9 |
| 2015/0039295 A1* | 2/2015 | Soschen | G06F 17/2705 704/9 |
| 2016/0246820 A1* | 8/2016 | Depaoli | G06F 17/30864 |
| 2017/0124158 A1* | 5/2017 | Mirhaji | G06F 17/30539 |

* cited by examiner

TAGONOMY—A SYSTEM AND METHOD OF SEMANTIC WEB TAGGING

RELATED APPLICATIONS

This application is based on a prior provisional application, Ser. No. 61/887,280, filed Oct. 4, 2013, the benefit of the filing date of which is hereby claimed under 35 U.S.C. § 119(e).

BACKGROUND

The Semantic Web is a collaborative movement led by the international standards body, the World Wide Web Consortium (W3C). The Semantic Web provides a common framework that enables data to be shared and reused across application, enterprise, and community boundaries. The term "Semantic Web" was coined by Tim Berners-Lee, for a web of data that can be processed by machines. Publishing data into the Semantic Web involves using languages specifically designed for the data. One example is the Resource Description Framework, or RDF. Another language, which builds on RDF, is the Web Ontology Language (OWL).

At the core of the concept of publishing data onto the Semantic Web is the ability to "assert" knowledge, without having to build rules or structure around how the knowledge is used, or will be used. Accordingly, unlike a traditional relational database, it is possible to collect data into the Semantic Web, without knowing exactly what the structure or use of the data might eventually be. With a relational database, it is necessary to predefine the schema, or way in which the data connects to itself, prior to inserting any information into the system. Additionally, modifying the structure of a relational database is difficult at best, and if modified, the modification is a global change to the schema. For this reason, it is not possible to have multiple root schemas. Furthermore, it is nearly impossible to query across relational databases where there is an overlap of information, since a relational database query assumes that it can only query against the data available in a single database system.

A Semantic Web system does not constrain queries or data to exist in a single system, and there are standard ways of mapping data from one system to another. Additionally, RDF or OWL can be used to define "how things work" or "the relational structure" of the data. These definitions can be changed at any time, because they are not required while collecting or storing the data. As a result, it is possible to have many versions of the definitions, where each definition is optimized for a specific task. A simple definition version might be used for a simple query, thus providing a sparse schema, while a complex OWL version can be used to provide much more complex inferences and semantic language connections.

However, with the many benefits of the Semantic Web come many challenges. In 2006, Tim Berner Lee and colleagues stated that, "This simple idea . . . remains largely unrealized." Other types of database systems, such as document data stores, are growing at a faster rate than the Semantic Web. For example, MongoDB is a document data store, and its popularity is growing rapidly. These alternative data systems have "loose" schemas, meaning that they can change over time. Yet, the documents themselves tend to have requirements that end up not changing over time. These data systems have their benefits over a traditional relational database, but they do not address the same requirements as the Semantic Web.

Semantics, is a Greek word, which is defined as the study of meaning. It focuses on the relation between signifiers, like words, phrases, signs, and symbols, and what they stand for, or denote. The Semantic Web enables RDF and OWL, for example, to help define the meaning of data that is represented within the system. However, as with all things that contain fuzzy logic, definitions and other inferences, the ontology describing even a small system can become quite complex. In fact, the more logic the system contains, the more complex it becomes, possibly infinitely complex, since the connections with one element might span multiple ontological domains. A simple example will help to illustrate this point. Suppose that the data in question pertains to a pizza. A relational database might include a table containing pizza names, and another table containing toppings. Perhaps each topping would have columns indicating whether the topping is a meat product or a vegetable product. A third table might include a unique pizza identification (ID), e.g., an ID for Pepperoni, and one row for each topping on that type of pizza. However, in the Semantic Web world, the OWL description looks like a node graph and the relationship are defined a bit differently. FIG. 1 illustrates a visual graph 100 of an exemplary "pizza" ontology.

It is important to note that the ontology shown in FIG. 1 is completely separate from the actual data about the various types of pizza that might be considered. Data is "asserted" into the ontology database, but does not need the entire ontology. The data that is asserted only requires what is considered to represent the types of nodes and their unique identifiers. Data comes in the form of N-Triples, each including three elements that are always the same, as shown below:

"Pepperoni Pizza" "is-a" "Pizza"

The first component (i.e., "Pepperoni Pizza") is the subject, the second (i.e., "is-a") is the predicate, and the third component (i.e., "Pizza") is the object. Although some semantic systems extend this concept, all semantic systems have Triples that are the basis of all data input. There are many challenges and benefits with regards to how data is represented in this manner. One of the more important benefits is that the data can be separated from the ontology that defines the "meaning" of the data. To query whether a "Pepperoni Pizza" has "Meat," a user might employ a query language such as SPARQL, which can be loaded with the query and ontology at the same time. With this approach, it is possible to modify the ontology for every query, or globally, to make the ontology more intelligent about, for example, what makes a "Vegetarian Pizza." Although there may not be an "assert" stating that "Pepperoni Pizza" "is-a" "Vegetarian Pizza," the ontology can be used to define that "all pizza's without meat are vegetarian," thus returning results to a query seeking to identify all vegetarian pizzas.

The challenge, however, is how to enable a more logical way of using the ontology. As ontologies grow more complex, they become less human readable, and less effective as a classification system. People and programs tend to deal with things that are classified into various groupings, since this is an easier way of breaking down problems. One term used for this type of concept is "Taxonomy." The general term, Taxonomy, is the practice and science (study) of the classification of things or concepts, including the principles that underlie such a classification. An exemplary pizza taxonomy, for example, might look like the following:

Food Group
  Pizza
    With Meat
      Pepperoni

Hawaiian
Without Meat
Cheese

Such a taxonomy is useful because it essentially walks through the process of selecting the final context. A person does not need to understand all of the nodes on the Taxonomy, since it is a directed graph. The person can simply start at the top and work their way down the graphical hierarchy. However, this approach makes it difficult to include properties, such as "Extra Cheese," since it would be necessary to add that property as an option under every pizza, or alternatively, to create another Taxonomy such as "Topping Selections."

It would be desirable to address the shortcomings of using an ontology or taxonomy by using the best of both of these systems. Such an approach should provide a way to present data in an organized way, either to a human or to a computing device software algorithm, yet should be able to produce a set of N-Triples describing the work performed semantically.

SUMMARY

This application specifically incorporates by reference the disclosure and drawings of the patent application identified above as a related application.

One aspect of the following discussion is directed to a system for implementing a process to organize input data so that the input data is readily accessible by both a human and a computing device. This goal is achieved by describing the input data semantically. The system includes a specialized asset server computing device that accesses the input data and enables semantic data to be added to annotate selected elements of the input data. A specialized asset viewer presents a portion of the input data to a user, where the portion is selected by the user from the input data. The specialized asset viewer also provides a graphics user interface to enable the user to provide intelligence on a specific element selected in the portion of the input data. The intelligence that is provided by the user is translated by the specialized asset viewer into N-Triple assert data associated with the specific element. So, for a plurality of portions of the input data and specific elements in the plurality of portions that are selected, corresponding N-Triple assert data are created. A tagonomy editor enables tagonomies to be created that are assigned to different parts of the process and which are employed to facilitate describing the input data semantically. A semantic engine loads the corresponding N-Triple assert data created for the specific elements selected within the plurality of portions of the input data. The semantic engine enables queries to be formulated and processed to retrieve desired data from the input data for use in the process, until elements in the input data that meet specified criteria in the queries have been identified.

Another aspect of the following discussion is directed to a method for tagging input data to enable both computing devices and humans to readily search the input data for desired content. The input data are reviewed to select one or more portions for tagging. Each portion selected for tagging is associated with an N-Triple assert that indicates whether the portion selected meets an initial criteria. For each portion of the input data that has been tagged to indicate that the portion meets the initial criteria, an element included in the portion is selected and the element selected is tagged with an N-Triple assert to indicate a type of the element. For elements that were tagged to indicate the type of element that was selected, additional information about the element is provided and the additional information is associated as metadata assigned to the element. The N-Triple asserts and additional information provided for the portions selected from the input data are saved as tagonomy data that is searchable by a computing device and by a human to find desired elements in the input data.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 9:
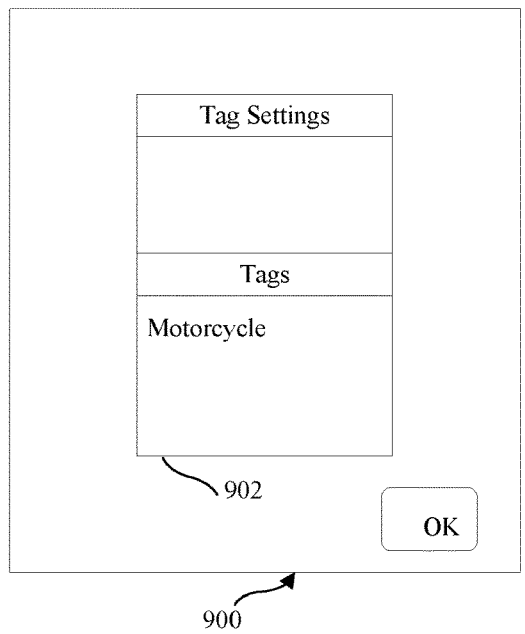
Figure 10:
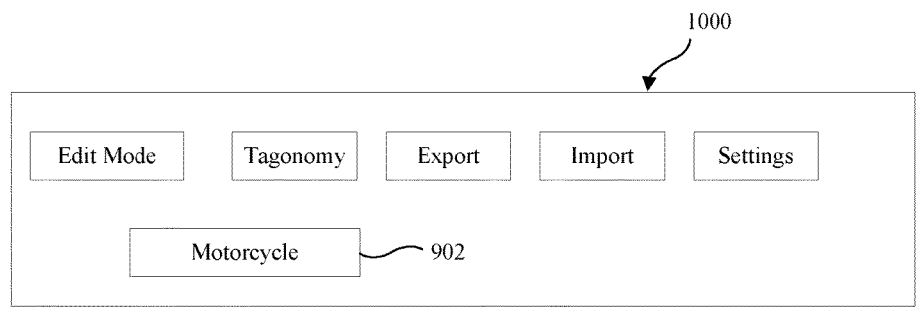

FIG. 9 an example of a graphic user interface provided in the DESI software for enabling a user to edit a control element;

FIG. 10 illustrates the exemplary graphic user interface of FIG. 9, after the user has renamed the control button as "Motorcycle;"

Figure 11:
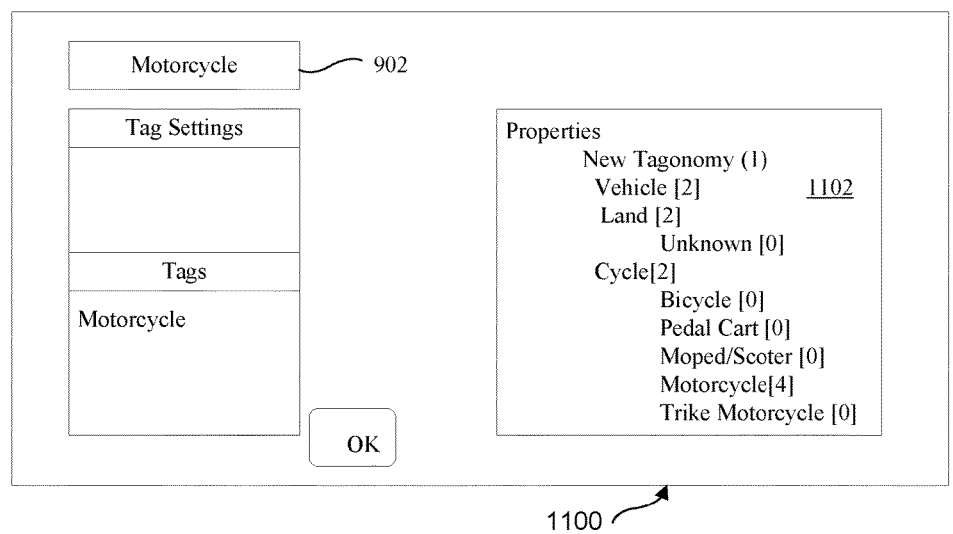
Figure 12:
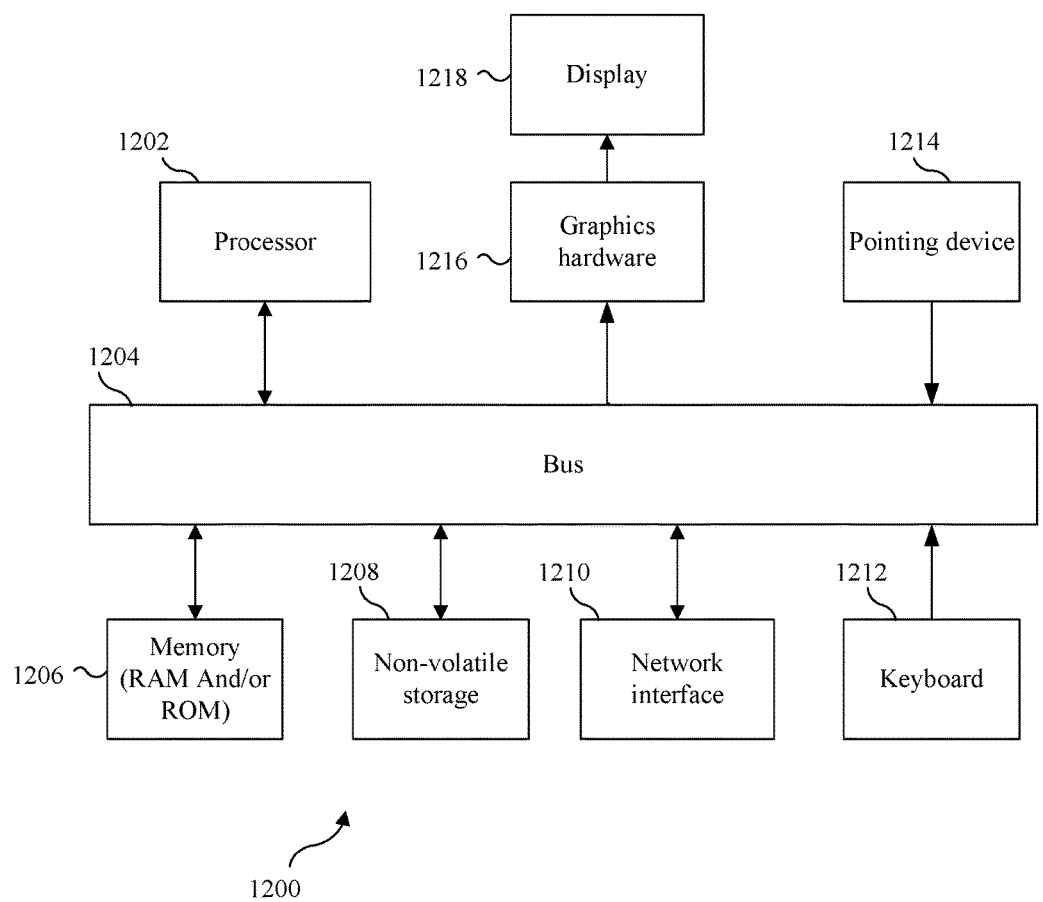

FIG. 11 illustrates an exemplary graphic user interface showing how any number of tagonomy nodes can be added to a control button; and FIG. 12 is an exemplary schematic block diagram of computing device suitable for executing software instructions that can implement the present novel approach for tagonomy of a video or other media.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

In accordance with the present novel approach, a system has been developed that is referred to as a "Tagonomy." The Tagonomy is both an extended Taxonomy and a Semantic assertion system. Also, this approach facilitates a complex multi-staged system that enables the exploitation of data through one or more semantic ontologies, where each stage can employ one or more algorithms or crowd sourced/large workforce systems. For example, assume that the data to be exploited is a set of video assets, and the information needed is an identification of the type of people and vehicles that are included within the video. The system developed by the present approach, which is called Distributed Exploitation and Semantic Intelligence (DESI), provides a three step method of using both algorithms and humans to perform the required work asynchronously.

An exemplary system enables interaction with a few different types of users, as defined below:
  Administrator—a user who can perform all tasks;
  Triage User—a user who can review small bits of video and use a triage Tagonomy to indicate if the video is either (a) Interesting, or (b) Not Interesting;
  Object Of Interest (OOI) User—a user who selects people or vehicles within the video, as well as uses a simple Tagonomy that enables the user to specify either (a) an Object, (b) a Person, or (c) a Vehicle;
  Task Expert—a user or a computing device executing the machine instructions of a computer algorithm that are matched to a specific task of a workflow applied to process input data. For example, at Task Expert might be a user who is an expert on vehicles and is assigned the task by the Administrator of using the system to view objects of interest that are vehicles; the vehicle expert would only have access to the Vehicle Tagonomy, enabling that user to further classify a vehicle within the video or other input data. Thus, the Administrator can define very complex concepts for processing the input data, in which specific users (i.e., Task Experts) are matched with the tasks of a workflow, and breaking down the steps of the work process into smaller tasks, which can depend on each other, and can be split depending on a specified filter. In this manner, the Administrator essentially creates an assembly line for humans and computing devices executing software algorithms to process the input data; and
  Temporal Algorithm—an algorithm that can take a single entity, such as an object, in a single frame, and find the same entity in previous or successive frames, even if the orientation or lighting in the previous or successive frames changes by incremental amounts.

Additionally there are a few different components of the exemplary system, as defined below:
  Specialized Asset Server—a server that can serve the content being tagged/exploited in a way that enables adding semantic data to annotate various elements of the original data;
  Specialized Asset Viewer—a viewer that provides a user the ability to perform their work, by selecting the "work to be done" and presenting it to the user, and then uses a Tagonomy graphics user interface (GUI) control to provide intelligence on various elements of the video or data, and this intelligence input is eventually translated into N-Triple assert data, making it usable within a more complex ontological system;
  Tagonomy Editor—an editor that enables the Administrator to create Tagonomies, which are then assigned to the various steps of the process. To generate web ontologies, an open source program called Protégé is used in a present exemplary embodiment, but it should be understood that other software can alternatively be used for this purpose. Every node on the tagonomy can have 1-n asserts associated with it. Additionally, the specialized asset viewer adds its own asserts while the tagging takes place, such as the time of the tag in the video, and the x, y, width, height properties of a bounding box used to select an entity; and
  Semantic Engine—a semantic database component that can load all of the data's N-Triple (RDF) data and enable queries. One query, which fetches work for the first step of this process can be, "Fetch all of the fragments that are not yet tagged with the Interesting/Not Interesting Ontology." For example, fragments, from a video can be chunks of the video that might be limited to a small interval of time, e.g., five seconds each.

Figure 1:
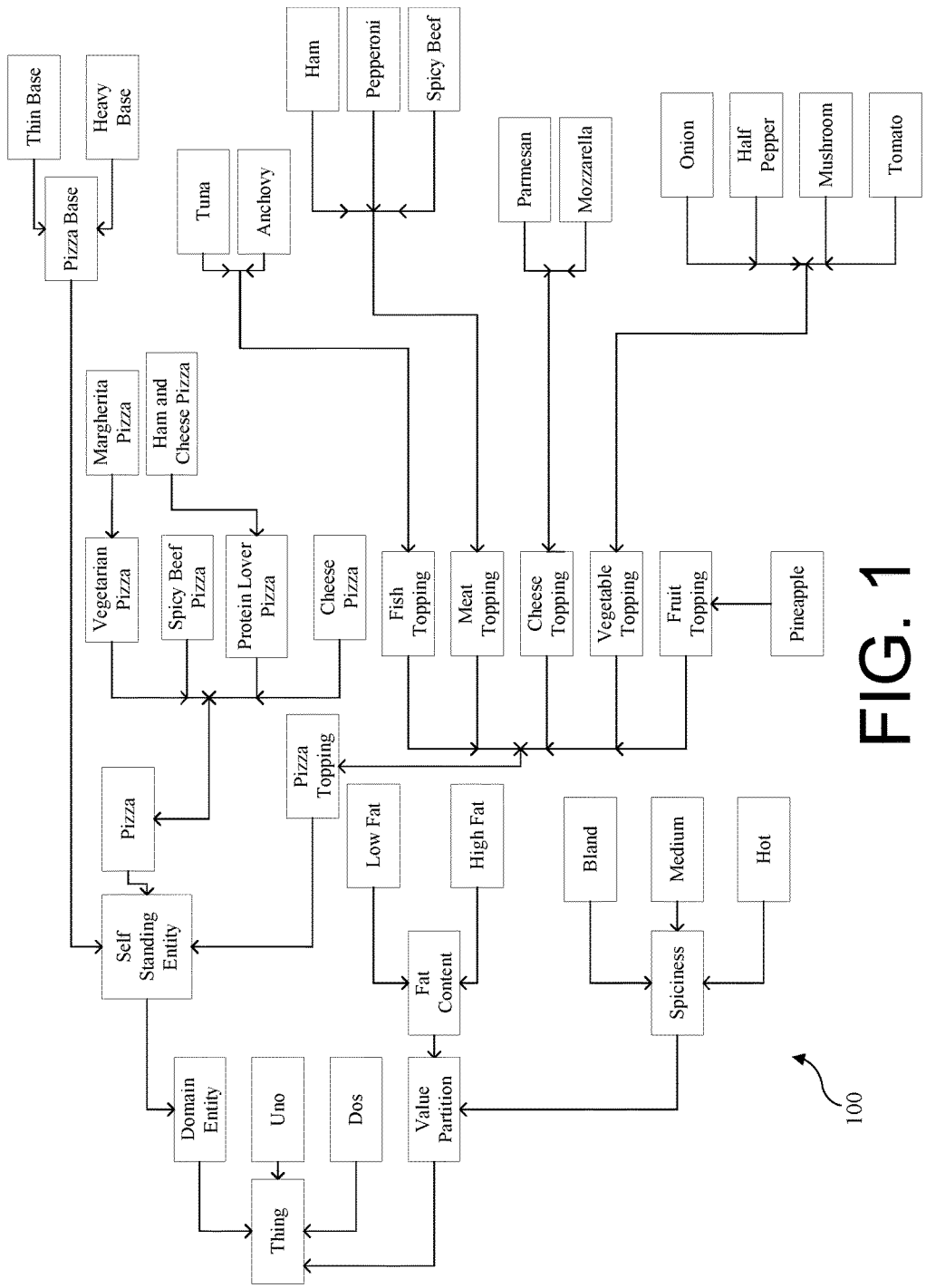
FIG. 1 is a schematic graph illustrating an exemplary "pizza" ontology.
Figure 2:
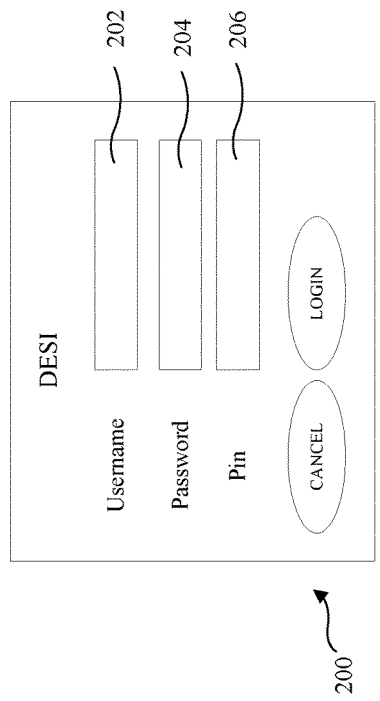
FIG. 2 is an exemplary is an exemplary user login screen image for a Distributed Exploitation and Semantic Intelligence (DESI) program that is used for implementing the present novel approach.

Using DESI, a user would first log into the system, as illustrated in the user interface shown in FIG. 2. Based on their credentials, which can, for example, include a username 202, a password 204, and may include a pin 206, various exploitation options for the system are available to the user in DESI. Work on a specific task can be provided to the user for them to perform. Although the work usually will involve creating a tagonomy, the unit of work assigned to a user can involve other tasks, such as asking the user to enter a brief description of an object in an image or other portion of the input data. Each unit of work performed by a user is referred to as a "node in the workflow" that is being executed. The workflow selected by an administrator can be used to generate complex processes for the input data (i.e., workflows), which will then generate tasks for the DESI client or user, driving users and algorithms to work together seamlessly.

Figure 3:
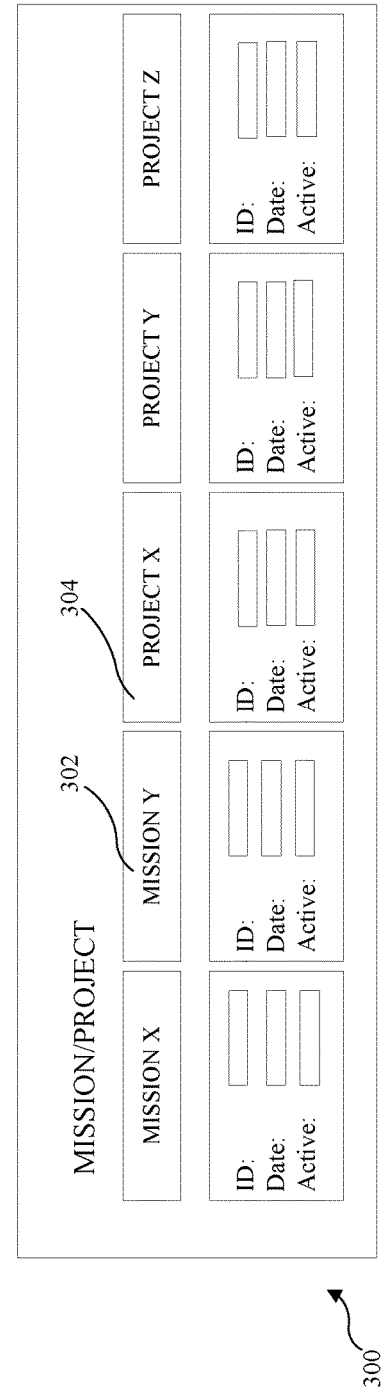
FIG. 3 is an exemplary graphic user interface included within the DESI software program that enables a user to select a project or mission to work on in connection with the a video or other image source material.

If the user is an administrator, then the administrator can select any mode of work they prefer. In the following example, there are three steps performed by humans and one performed on a computer by executing a software algorithm. The system can be configured to perform any number of steps using these same concepts. Once logged into the system, the user can select a "mission" 302, or a "project" 304, each of which represents a set of data to be tagged, as shown by an exemplary graphic user interface 300 in FIG. 3.

Figure 4:
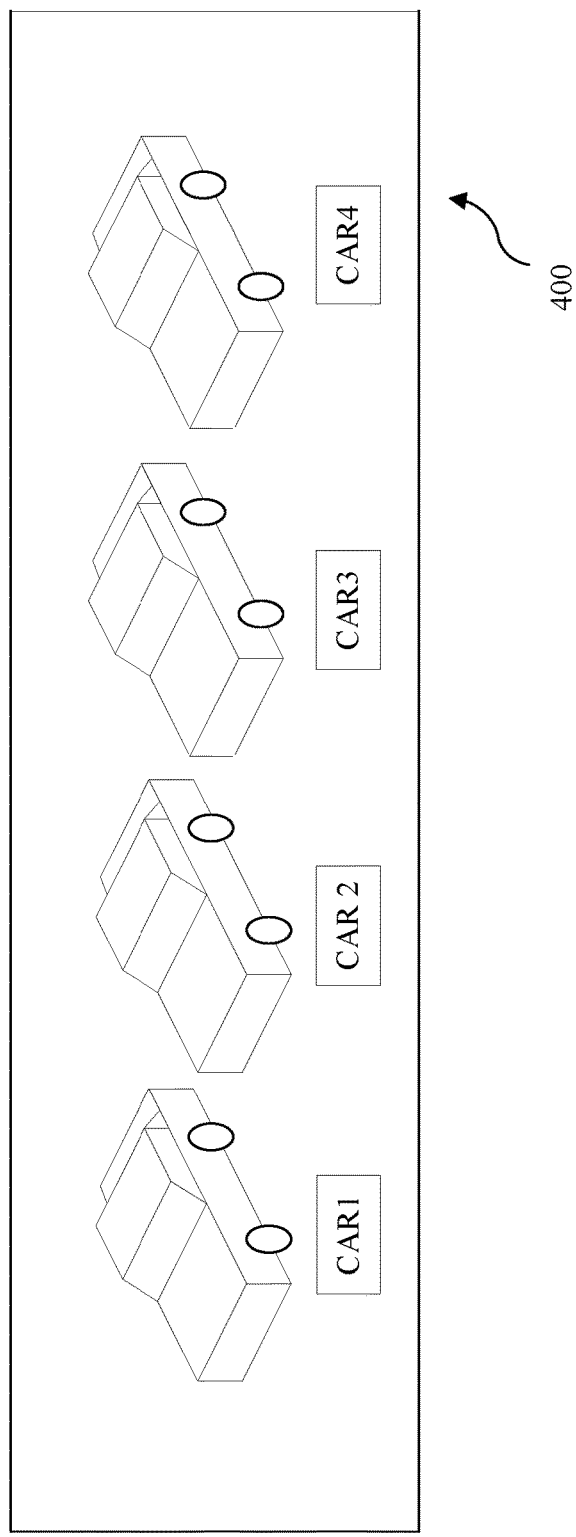
FIG. 4 is an exemplary image showing what a user might be presented when working on a project within the DESI software program.

As an administrator, a user would be prompted to select the work function that the user would like to perform. However, it is also contemplated that in the present approach, the work function selection can be automated based on a matrix depending upon the expertise of the user, and the work required to be accomplished. Additionally, the user might only see the projects or missions that they are entitled to view based upon a set of permissions associated with the projects of missions and the login information that identifies the user. The user can then be presented with a video player and provided with a specific quantify of work, e.g., 10 units of work. FIG. 4 illustrates an exemplary image 400 that a user might be presented within the DESI software program after selecting the mission or project corresponding to image 400 in the graphic user interface of FIG. 3.

It is contemplated that a user might be limited to a finite amount of time to perform their work, but this time limit is optional and not a requirement. Although not shown in the Figures, this phase of the work is directly tied to the Tagonomy. An example of such a Tagonomy is as follows:

Interesting
   This tag contains the following ontological N-Triples: "Fragment" "is" "Interesting"
Not Interesting
   This tag contains the following ontological N-Triples: "Fragment" "is-not" "Interesting"

When more work is requested, a SPARQL (i.e., a recursive acronym for "SPARQL Protocol and RDF Query Language") query is sent to the Semantic Engine to return short segments, e.g., only five second video fragments, which are not yet marked by either of these N-Triple values, i.e., not yet marked as "Interesting," or "Not Interesting." The order of the fragments is not relevant, and the user can continue to request work as long as there are fragments that have yet to be tagged with one of these N-Triple values.

Figure 5:
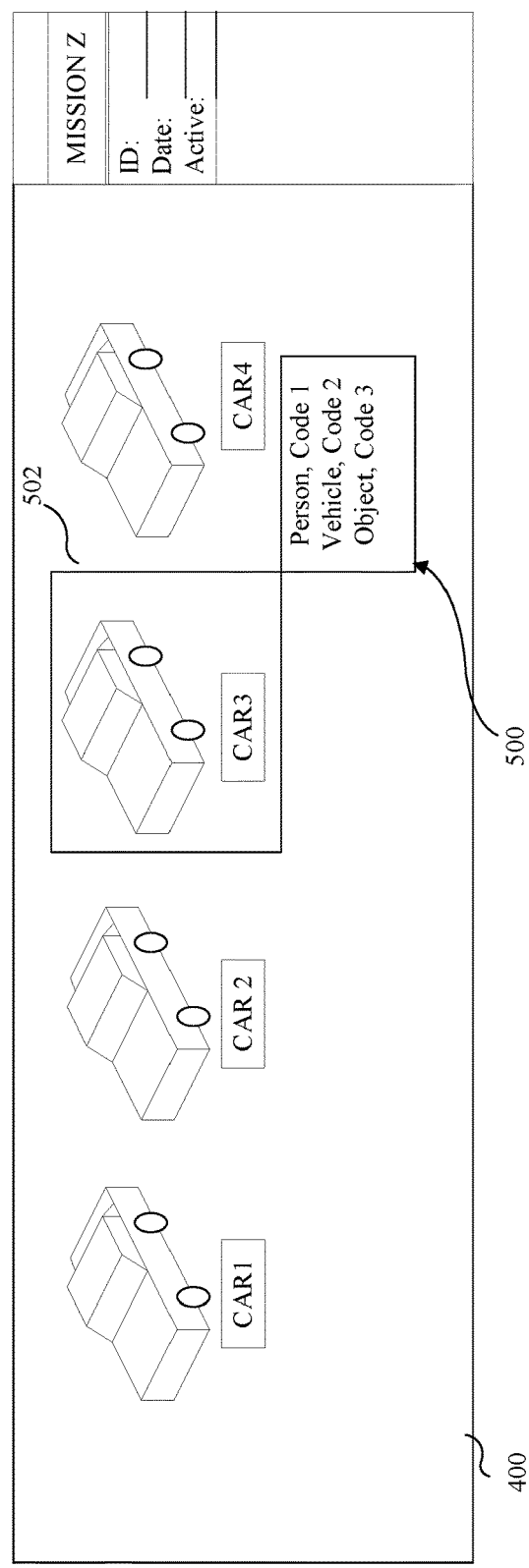
FIG. 5 is an exemplary graphic user interface for the tagging mode, when selected by a user for tagging a video image.

The next step is for the same or a different user to log in to DESI as an OOI User, or as an administrator, and select the tagging mode. An exemplary graphic user interface listbox 500 for this mode for tagging video is illustrated in FIG. 5.

Working in the tagging mode, the user can add as many bounding boxes to entities in an image as needed. Software algorithms running on the computer on which the DESI program is running (or a different computer) can help pre-identify possible objects in each portion of the video or image. In the example illustrated in FIG. 5, the image currently shows a single car 502 being selected. Once car 502 is selected, Tagonomy listbox 500 is presented showing the tagonomy attached to this specific work step. In this example, the listbox gives the user the option to identify the entity as a Person, or as a Vehicle, or as an Object. These options are also each associated with their own corresponding ontological N-Triple asserts. Additionally, N-Triples are generated that connect the tag information to the specific asset, time, frame and x, y, width and height of the area selected with the bounding box in the segment or image.

Although not shown here, nodes on a tagonomy can contain properties. One example could be "color." Properties are associated with one or more nodes on a tagonomy and if any node was selected with a given property, then these will show up under the tagonomy listbox, enabling the user to add additional data that is not part of the taxonomy structure of the tagonomy. Color, for example, has its own tagonomy, and thus its own ontological definition. There are a few properties any node on the tagonomy can have, as follows:

Legs—a leg of a tagonomy node is a child node;
Path Node Element—a path node is a link to another tagonomy node;
Property Node Element—a property node has many sub-types, and examples of these are:
   Tagonomy—a pointer to another tagonomy. When this node is hit, another tagonomy is viewed, providing more tag options.
   In Point—for video, this sub-type designates an in-point (i.e. start) during an editing session.
   Out Point—for video, this sub-type designates an out-point (i.e., end) during an editing session.
User Action Node Element—these are special types of user actions that can be requested. One example is Annotation, which causes a GUI dialog to open for the user to provide textual data that will be associated with the element.
Activation Chain Node Element—this element activates a chain of the Tagonomy without user input, where all nodes on the chain are activated so that they can produce any of the options a tagonomy node can produce.

Figure 6:
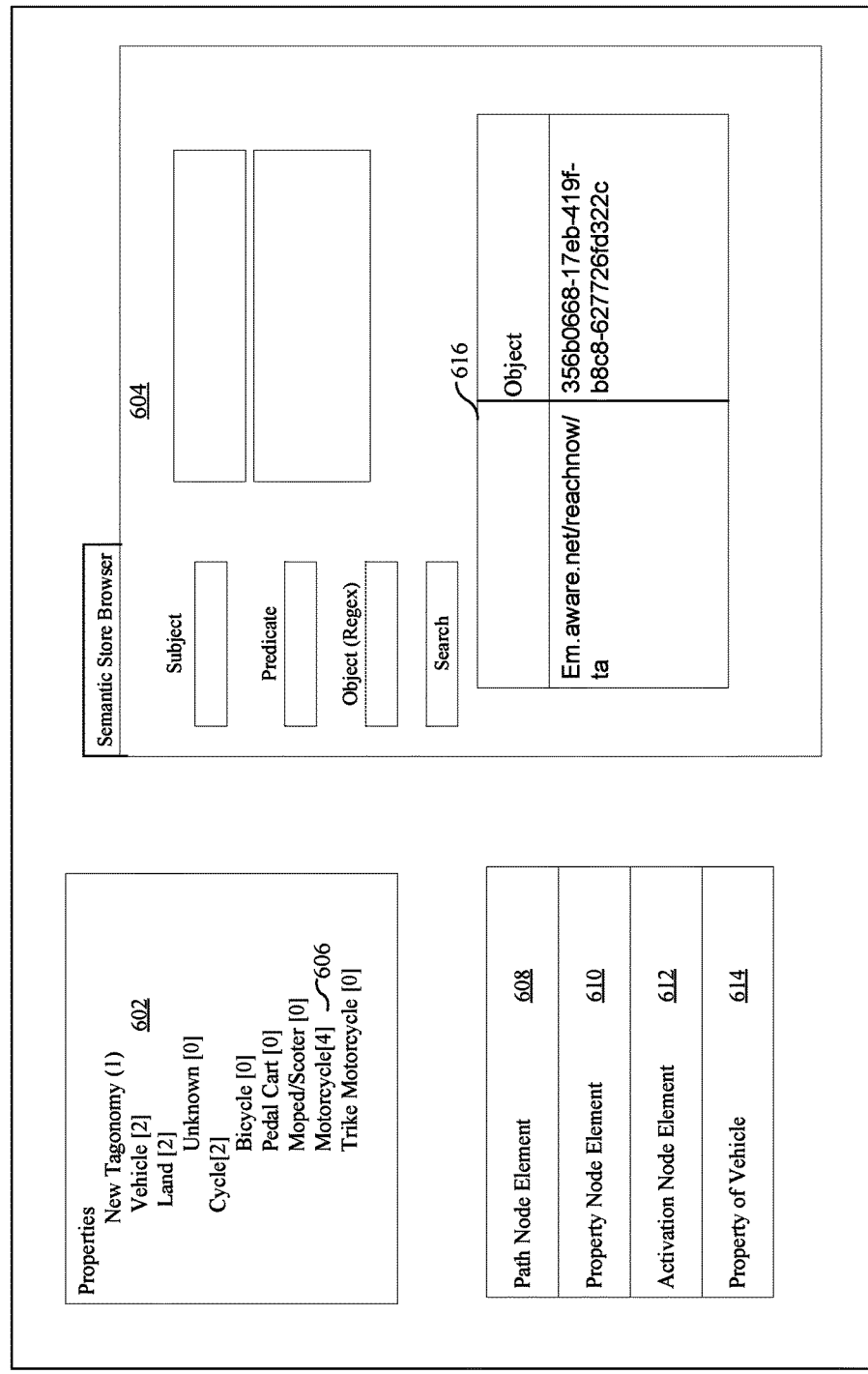
FIG. 6 is an exemplary graphic user interface screen for a tagonomy editor showing some of these elements that can be selected for editing the tagonomy of a video.
Figure 7:
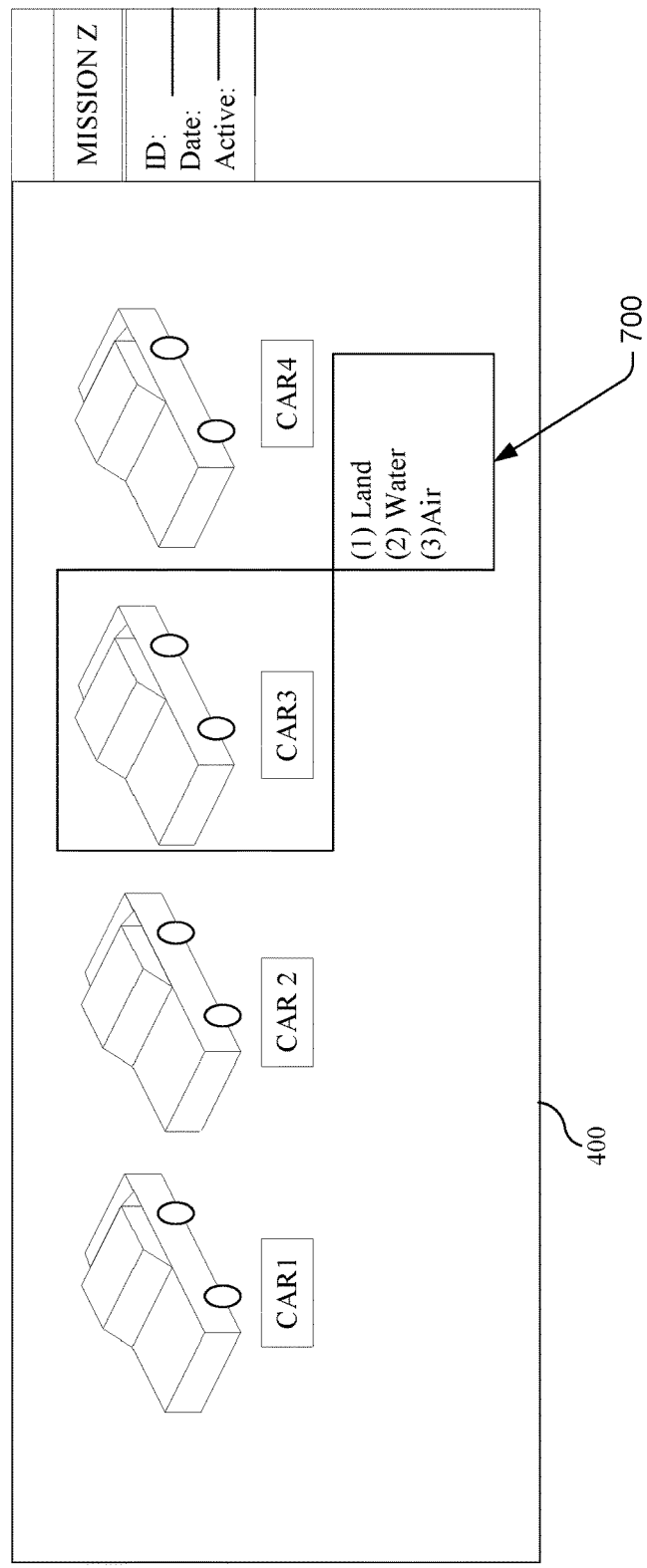
FIG. 7 is an exemplary video image showing how a vehicle expert might further refine the tagonomy provided by an earlier user, by adding additional vehicles regarding a selected vehicle.

An example of a Tagonomy editor 600 showing some of these elements is illustrated in FIG. 6. On the left side of FIG. 6 is a Tagonomy area 602, which is illustrated as a taxonomy/tree structure. On the right side of FIG. 6 is a semantic engine or SPARQL query interface 604, which provides direct access to one or more ontologies. This exemplary GUI interface to the system enables a drag-drop to move a selection from one of the Tagonomy area and the SPARQL query interface areas to the other. As shown in this example, a Motorcycle tagonomy node 606 is selected. It is showing a Path Node Element 608, a Property Node Element 610, an Activation Chain Node Element 612, and a single N-Triple 614 relating the tagonomy node to a Vehicle. On the right of this exemplary GUI are all of the N-Triples 616 that make up the ontology, which defines the domain of cars and people. Once this task is completed, it makes it much easier for the user to use the tagonomy, regardless of the complexities of how each node on the tagonomy connects to one or more ontologies, or to one or more other property types. With an advanced tagonomy, it is possible to review the work process of how a vehicle expert would further classify or tag a vehicle identified by a previous user. FIG. 7 illustrates an exemplary interface 700 showing how this action can be implemented.

The video player identifies the vehicle shown in FIG. 7, based on work performed at an earlier time. Yet now, it is using another part of the larger tagonomy. In this case, the DESI software knows that the selected object is a vehicle, so it is enabling the user to traverse the tagonomy further by selecting the type of vehicle (i.e., a land vehicle, a water vehicle, or an air vehicle). Although not shown in this Figure, once the type is selected, the user is presented with more and more options to select or enter to more completely describe or indicate details for the vehicle, which can extend down to indicating the make and model of the vehicle. Properties could even be selected to identify modifications made to the vehicle, the year it was manufactured, its tire type, or any additional properties an expert might be able to see and ascertain, based on the visual information presented within the video or image. Work is requested by this OOI user in a similar manner as in the other work steps. The semantic engine requests "Fragments that are not yet tagged with detailed vehicle information" to load additional fragments that can be tagged with more detailed information.

Once the second OOI user selects the vehicle in the video, the software enables auto-select of an algorithm to provide more data for the vehicle. For example, an algorithm can automatically be selected that works best with parking lots, daytime environments, and vehicles. This algorithm can then automatically find and add more detailed data to the semantic engine in terms of where the car is in previous or successive frames of the video.

Also, a computer software algorithm can be employed in connection with a parking lot, to identify one or more objects as an automobile, and a human can then be requested to confirm this determination. Further, if a human tags an automobile, the computer software algorithm can use that tag to help train internal algorithms, so that the algorithm can more accurately identify an object as an automobile. Using this approach, there can be a general algorithm that can look for any automobile, or there can be a more specific software algorithm, which is easier to achieve, that can continue to identify the same automobile in frames occurring before and after it was tagged by a human in a frame of a video. This temporal capability enables the computer software system to auto-tag the same object at different points in time, e.g., in previous or successive frames in a video, or in other videos that include the same object.

Even if modifications are made to the ontology, as long as the unique node identifiers are not modified, none of the data in the semantic engine needs to change. Indeed, it is possible to add logic to the ontology, such as "Land Vehicles" "Have" "Tires", and then, automatically to query the semantic engine for all video containing tires, even though perhaps, no human has tagged tires during the work process. In this way, the power of using this Tagonomy system reveals itself in providing for a system and method of breaking down the problem into smaller units of work. This approach then enables a classification system to provide humans and/or algorithms with a method for using a complex ontology without having to fully understand what is occurring within the larger system.

Another example of this novel approach is shown within a diagramming system, enabling users to design a visual tagging GUI, representing a tagonomy visually rather than in tree format. These two systems can be combined, where a visual element or button can connect to a listbox-tagonomy-control or vice versa, or where a node on the listbox-tagonomy-control can show a canvas-tagonomy-control, or any combination thereof.

Figure 8:
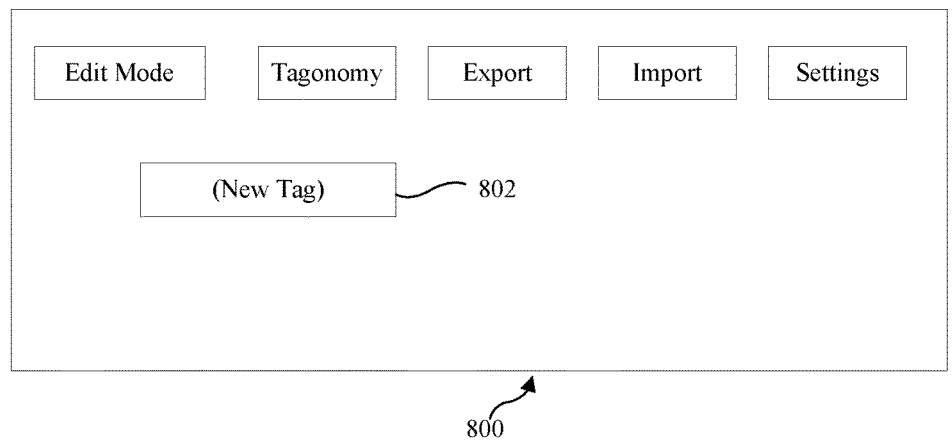
FIG. 8 is a graphic user interface screen showing an exemplary tagonomy canvas.

FIG. 8 illustrates an exemplary graphic user interface 800 showing what a tagonomy canvas might look like. In this example, a single button 802 was added to the control by the designer. It is possible to name the buttons, change their shapes, add images and generally modify the look and feel of the tagonomy canvas in many different ways. However, what is important is that the button represents a single node on a tagonomy. What is shown in FIG. 8 is the "Edit Mode" of a tagonomy canvas. In "Run Mode," it isn't possible to add buttons or edit the objects on the tagonomy canvas; it is only possible to click on the elements. When a user clicks on a button or element, the result is similar to selecting a node on a tagonomy. When editing an element, in a manner similar to the Tagonomy editor, it is possible to attach one or more tagonomy tags.

FIG. 9 illustrates an exemplary software graphic user interface 900 for enabling a user to edit the properties of a control element. In this example, a selected button 902 that is being edited represents a Motorcycle. Button 902 can be renamed accordingly, as shown in an exemplary graphic user interface 1000 in FIG. 10.

If this button is selected in run mode, it would activate the actions of the "Motorcycle" node on the currently loaded tagonomy associated with the button. As seen in an exemplary graphic user interface 1100 illustrated in FIG. 11, it is possible to add any number of tagonomy nodes 1102 to button 902. Thus, this approach includes a visual methodology of using the embodied tagonomy, and the examples discussed above illustrate how it would work in a canvas-like setting. In this case, the buttons can provide additional actions that are also built into the tagonomy, such as setting in/out points in video, labeling specific clips, and more.

Exemplary Computing System to Implement Tagonomy

FIG. 12 illustrates an exemplary computing device or computer system 1200 for executing software instructions or program(s), such as DESI, that enable a user to implement tagonomy of media, such as a video or other data structure. The computer system includes a processor 1202 that is coupled in bi-directional communication with a bus 1204. The bus is also coupled in bi-directional communication with a memory 1206 that includes both random access memory (RAM) and read only memory (ROM), or some other type of dynamic storage for both data and machine executable instructions that are executed by processor 1202, and with a non-volatile storage 1208, which may include a magnetic or optical storage medium and a corresponding drive. Data, such as a video or other object for processing in accord with the present novel approach, and machine executable instructions can be stored on non-volatile storage 1208. Computer system 1200 implements the exemplary approach described herein to process media in regard to machine executable instructions (which are of a non-transitory nature and are stored in non-volatile storage 1208 and loaded into memory 1206). This computer system is used to enable a user to load media and implement tagonomy in regard to various aspects of the media.

While not required for implementing the present novel approach, a network interface 1210 (useful for implementing communication over a local area network and/or wide area network, and/or over the Internet) can be included to enable the computer system to communicate with other computing devices or storages, and the network interface may comprise a modem, or a network interface card for coupling to an Ethernet, a token ring, or other type of local area network, or a wide area network, or to the Internet. The network interface enables computer system 1200 to upload and/or download data and/or software programs by communicating with other computer systems, or servers, or storage devices.

Bus 1204 may also include graphics hardware 1216 for coupling to a display 1218 that displays graphics and/or text, a pointing device 1214, such as a mouse, trackball, touchpad, or other input device for controlling a cursor and making selections, and a keyboard 1212 (or touch screen) for providing input of alphanumeric text and controlling the operation of computer system 1200.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A system for implementing a process to organize non-semantic visual input data so that the non-semantic visual input data is readily accessible by both a human and a computing device, by describing the non-semantic visual input data semantically, comprising:
   (a) a specialized asset server computing device that accesses the non-semantic visual input data and enables semantic data to be generated and added to annotate selected elements of the non-semantic visual input data;
   (b) a specialized asset viewer that presents a portion of the non-semantic visual input data to a user that is selected by the user from the non-semantic visual input data and provides a graphics user interface to enable the user to provide intelligence on a specific element selected in the portion of the non-semantic visual input data, the intelligence provided by the user being translated by the specialized asset viewer into assert data associated with the specific element, so that for a plurality of portions of the non-semantic visual input data and specific elements in the plurality of portions that are selected, corresponding assert data are created;

(c) a tagonomy editor that enables tagonomies to be created that are assigned to different parts of the process and which are employed to facilitate describing the non-semantic visual input data semantically; and (d) a semantic engine that loads the corresponding assert data created for the specific elements selected within the plurality of portions of the non-semantic visual input data and which enables queries to be formulated and processed to retrieve desired data from the non-semantic visual input data for use in the process, until elements in the non-semantic visual input data that meet specified criteria in the queries have been identified.

2. The system of claim 1, wherein the tagonomy editor is employed to associate asserts with nodes on the tagonomy to describe the non-semantic visual input data semantically.

3. The system of claim 2, wherein the specialized asset viewer is employed to add additional asserts while elements selected from the non-semantic visual input data are being tagged, the additional asserts added by the specialized asset viewer relating to details of the elements selected from the non-semantic visual input data.

4. The system of claim 1, further comprising a computing device that is programmed with machine executable instructions to recognize an element selected in the non-semantic visual input data at one time, at other times at which the element appears in the non-semantic visual input data.

5. The system of claim 1, further comprising a computing device that is programmed with machine executable instructions to pre-identify elements in portions of the non-semantic visual input data for tagging, so that the elements that are pre-identified are reviewed for tagging with assert data using the specialized asset viewer.

6. A method for processing non-semantic visual input data to organize the non-semantic visual input data so that the non-semantic visual input data is readily accessible by both a human and a computing device, by describing the non-semantic visual input data semantically, comprising:

(a) enabling a user to select and access portions of the non-semantic visual input data that have not yet been tagged with asserts, for tagging with asserts according to defined criteria;

(b) selecting elements in the portions of the non-semantic visual input data that have been tagged with asserts, for further processing, wherein one type selected from a plurality of different types is assigned to each selected element, each type that is assigned being associated with a corresponding assert;

(c) generating additional asserts that connect the asserts associated with each type of element, to properties of said element; and (d) for one or more types assigned to the selected elements, enabling one or more additional properties having their own tagonomy to be associated with the selected elements, wherein the asserts and properties associated with the non-semantic visual input data are in a form that enables the non-semantic visual input data to be readily accessed and queried by both a human and a computing device.

7. The method of claim 6, further comprising using a computer algorithm for detecting when and where a specific element that was selected at one point in time within the non-semantic visual input data, is also present within the non-semantic visual input data at other times.

8. The method of claim 6, further comprising the step of enabling a computing device to preselect elements in the non-semantic visual input data from among the portions of the non-semantic visual input data that have been tagged with asserts to indicate that further processing of the portions is appropriate, at least some of the elements that are preselected by the computing device being further processed to assign the type of the element.

9. The method of claim 8, wherein the computing device assigns a probable type to each element that was preselected, the elements preselected by the computing device and the probable type assigned to the elements being subject to review by a human user.

10. The method of claim 6, further comprising using a tagonomy editor to specify a tagonomy node for an element selected in the non-semantic visual input data and to associate one or more ontologies with the tagonomy node.

11. The method of claim 6, wherein once a type is assigned to an element, using a computing device to enable the user to traverse a tagonomy associated with the type assigned, to refine details of the type assigned to the element.

12. The method of claim 11, further comprising using the computing device execute an algorithm that selects an environment appropriate for the type assigned to the element, and based upon the environment that is selected, adding more details to the element based upon where the element appears at different times within the non-semantic visual input data.

13. The method of claim 6, further comprising defining how the non-semantic visual input data is processed in a workflow, so that task experts are matched with and assigned to carry out each task comprising the workflow.

14. The method of claim 13, further comprising breaking down the work process into smaller tasks, which can depend on each other, and can be split depending on a specified filter.

15. A method for tagging non-semantic visual input data to enable both computing devices and humans to readily search the non-semantic visual input data for desired content, comprising:

(a) reviewing the non-semantic visual input data to select one or more portions for tagging;

(b) tagging each portion selected with an assert that indicates whether the portion selected meets an initial criteria;

(c) for each portion of the non-semantic visual input data that has been tagged to indicate that the portion meets the initial criteria, selecting an element included in the portion and tagging the element selected with an assert to indicate a type of element that was selected;

(d) for elements that were tagged to indicate the type of element that was selected, providing additional information about the element and associating the additional information as metadata assigned to the element; and (e) saving the asserts and additional information provided for the portions selected from the non-semantic visual input data as tagonomy data that is searchable by a computing device and by a human to find desired elements in the non-semantic visual input data.

16. The method of claim 15, further comprising using a computing device to pre-identify elements in the portions of the non-semantic visual input data that meet the initial criteria as being of a type of element.

17. The method of claim 16, further comprising enabling a human user to review and confirm the type of element pre-identified by the computing device.

18. The method of claim 15, wherein providing additional information comprises specifying details for at least some types of the elements tagged in the portions of the non-semantic visual input data meeting the initial criteria.

19. The method of claim 15, further comprising using computing device executing a computer algorithm for detecting when and where a specific element that was selected at one point in time within the non-semantic visual input data, is also present within the non-semantic visual input data at other times.

20. The method of claim 15, further comprising defining how the non-semantic visual input data is processed in a workflow, so that task experts are matched with and assigned to carry out each task comprising the workflow.

* * * * *